Patented Aug. 5, 1947

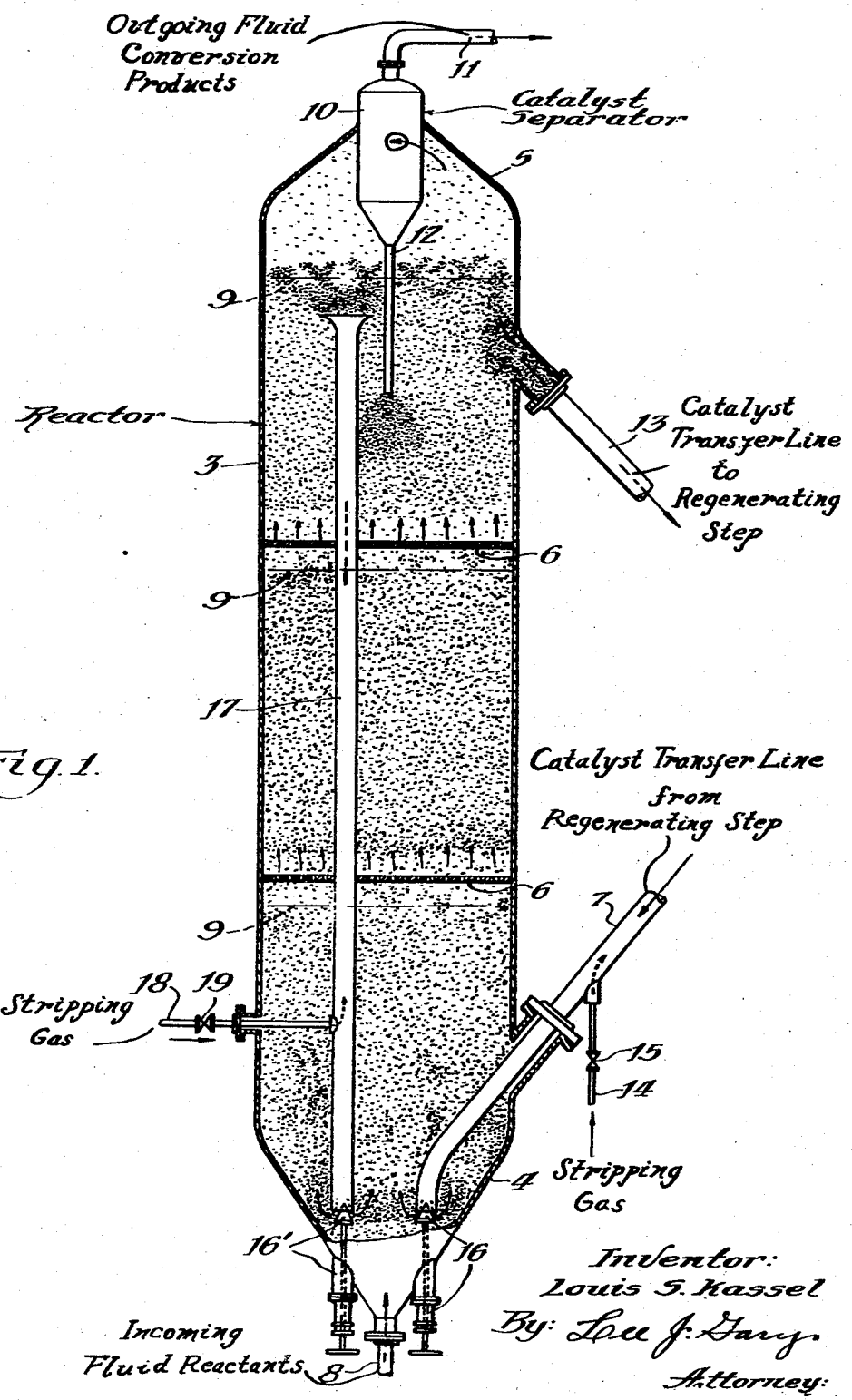

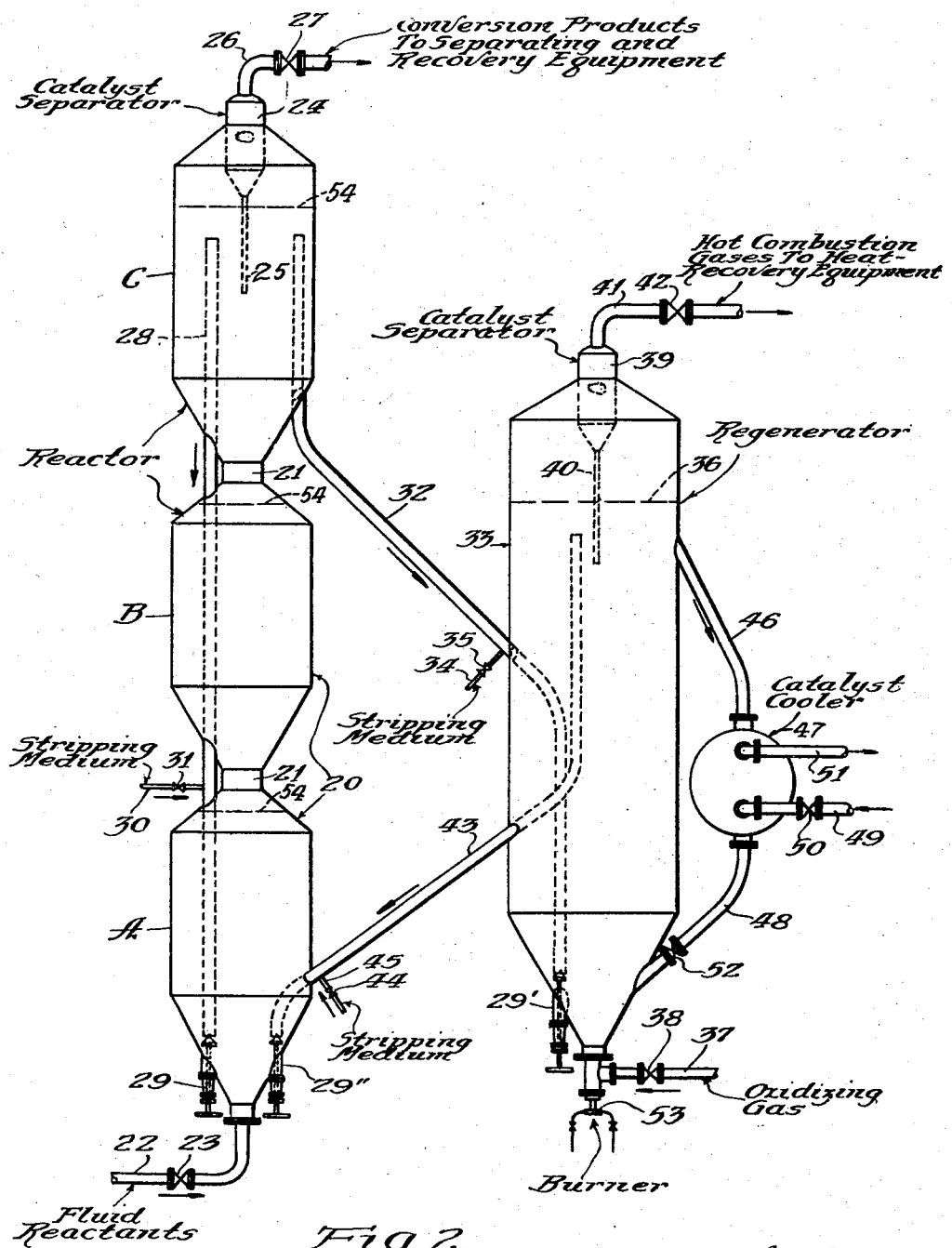

2,425,098

UNITED STATES PATENT OFFICE 2,425,098

CATALYTIC CONVERSION PROCESS

Louis S. Kassel, Riverside, Ill., assignor to Universal Oil Products Company, Chicago, Ill., a corporation of Delaware Application March 31, 1943, Serial No. 481,279

3 Claims. (Cl. 196—52)

The invention is directed to improvements in a process and apparatus for catalytically converting fluid reactants. The system provided is of the type in which a fluid-like bed of subdivided solid catalyst is maintained within the reaction zone, a stream of contaminated catalyst particles, upon which deleterious heavy conversion products have been deposited, being continuously withdrawn from said fluid bed in the reaction zone, supplied to a regenerating step in which the contaminants are removed to restore its catalytic activity and from which regenerated catalyst is continuously returned to the fluid bed in the reaction zone.

To maintain a relatively high concentration of catalyst in the reaction zone so as to obtain good contact between the catalyst and the reactants and limit thermal conversion of the reactants, the latter are passed upwardly through the reaction zone at a rate which will give rise to hindered settling of the catalyst particles. In other words, the net upward velocity of the reactants is greater than that of the catalyst particles. In such operations there is considerable hindered settling and a high concentration of catalyst particles in the fluid bed, but a light phase region exists above the fluid bed in which there is little or no hindered settling and a substantially lower concentration of catalyst particles.

Some reactions, and particularly the dehydrogenation of hydrocarbons, when conducted in a system of the fluid bed type, such as above outlined, have resulted in conversions and efficiencies which are inferior to those obtained in fixed bed operation. I attribute this to the fact that turbulence and rapid mixing of the catalyst in the reactor also results in mixing of the reactants, by their occlusion or adsorption on the catalyst or by other means. This mixing gives less favorable concentrations than are obtained in fixed bed operation and decreases the overall reaction rate. The effect is particularly important in butane dehydrogenation, for example, where the desired reaction is reversible and the undesired side reactions, leading to the formation of carbonaceous or heavy hydrocarbonaceous products and light gases, are substantially irreversible. Under such conditions the rate of the desired reaction is reduced, by mixing, more than the rates of the side reactions, and the efficiency of the process is thereby decreased.

It is an object of the invention to provide an improved operation of the general type above outlined, in which the recirculation of reaction products with the catalyst particles is materially reduced, as compared with that obtained in previous fluid bed type operations. It is the further purpose of the invention to accomplish the above stated object while maintaining internal circulation of the catalyst particles throughout the reaction zone so as to maintain a high catalyst concentration. This improved mode of operation is reflected in increased conversion rates and efficiencies as compared with previous fluid bed operations.

A further object of the invention is to reduce the space within the reaction zone wherein a low concentration of catalyst particles exists in the fluid bed, as compared with an otherwise similar operation in which little or no internal recirculation of the catalyst is permitted throughout the reaction zone.

To accomplish the above stated and other objects of the invention, the reaction zone is divided into a plurality of superimposed smaller reaction spaces through which catalyst particles, reactants and fluid conversion products are passed upwardly in series. A fluid-like bed of catalyst particles is maintained in each of the series of reaction zones and a region of reduced cross-sectional area and increased velocity is provided between each of these zones. Hindered settling is materially reduced or eliminated in these regions of higher velocity which separate the reaction zones so that there is little or no recirculation of catalyst particles and occluded conversion products between the several reaction zones of the series. However, in order to obtain recirculation of the catalyst particles through the several reaction zones, a stream thereof is withdrawn from the fluid bed in the upper zone of the series and passed through a stripping zone, wherein occluded fluid conversion products are substantially removed from the catalyst particles, the stripped catalyst being thence returned to the fluid bed in the lowermost zone of the series to pass upwardly therefrom through the succeeding higher zones with the vaporous reactants and conversion products.

The features of the invention will be more clearly understood with reference to the accompanying diagrammatic drawing and the following description thereof.

In the drawing

Figure 1 is an elevational view, shown principally in section, of one specific form of reactor incorporating the features of the invention.

Figure 2 is an elevational view of a modified form of the improved reactor provided by the invention and also illustrates one manner in which the reactor may be interconnected with a regenerating vessel to accomplish continuous regeneration of the catalyst and transfer heat from the regenerating step to the endothermic conversion reaction taking place in the reactor.

Referring paricularly to Figure 1, the reactor here illustrated comprises an elongated, vertically disposed, substantially cylindrical vessel comprising an outer shell 3, a substantially cone-shaped lower head 4 and a similar upper head 5. A perforate plate or similar partitioning member 6 is provided at one or more intermediate points within the shell between the upper and lower heads of the vessel to divide the interior of the vessel into a plurality of superimposed reaction zones. In the particular instance illustrated, two perforate plates 6 are provided to give a lower, an intermediate and an upper reaction zone.

A stream of hot regenerated catalyst particles from any suitable form of regenerator, not indicated in Figure 1, is directed downwardly through conduit 7 into the lower portion of the reaction vessel and, in passing from the lower end of this conduit, meets the incoming stream of fluid reactants to be converted, the latter being supplied to the lower end of the vessel through conduit 8 either in essentially vaporous or liquid state and in either preheated or relatively cold condition. When introduced to the reactor at a temperature below that desired for conducting the conversion reaction, the reactants are quickly heated by contact with the hot catalyst from the regenerator and, when introduced in liquid state, they are also vaporized by contact with the hot catalyst. The vapors and resulting vaporous and/or gaseous conversion products pass upwardly in series through the reaction zones and carry with them entrained catalyst particles. The velocity of the reactants and conversion products passing through each of the reaction zones is regulated by controlling the rate of introduction of the fluid reactants to obtain hindered settling in each of the three reaction zones. However, the perforate plates 6 reduce the effective cross-sectional area of the vessel between the reaction zones to give a sufficiently increased velocity through the openings in the plates 6 that catalyst particles will pass therethrough substantially only in an upward direction with the reactants and conversion products. Thus there is little or no circulation of catalyst particles through the plates from the upper reaction zone to the intermediate zone or from the intermediate zone to the lower zone.

The fluid-like bed of catalyst particles maintained in each of the series of superimposed reaction zones occupies the lower and major portion of the reaction space. The concentration of catalyst particles in these fluid beds is relatively high. In the upper portion of each reaction zone a light phase prevails which contains a much lower concentration of catalyst particles. The approximate upper extremity of the fluid bed or the interface between the lower dense phase and the upper light phase in each zone is indicated by the broken lines 9 and, as previously indicated, one of the objects of the invention is to keep this dense phase level at a maximum height, particularly in the lower and intermediate reaction zones wherein conversion of the reactants has not progressed to substantial completion.

Vaporous and/or gaseous conversion products and entrained catalyst particles are directed from the light phase in the upper reaction zone to suitable catalyst separating equipment, such as, for example, the cyclone separator, indicated at 10, wherein at least a major portion of the entrained catalyst particles are centrifugally separated from the vapors and gases. The latter are directed from the upper portion of the separator through conduit 11 to suitable fractionating and recovery equipment, not illustrated, and separated catalyst particles are returned from the lower portion of the separator through standpipe 12 into the fluid bed in any one or more of the reaction zones. In this particular instance, the catalyst particles from separator 10 are returned to the fluid bed in the upper reaction zone.

A stream of catalyst particles, upon which deleterious heavy conversion products of the reaction have been deposited, is directed from the fluid bed in the upper reaction zone through conduit 13 to the aforementioned regenerating zone, not illustrated in this figure of the drawing, wherein the combustible contaminants are burned and wherefrom resulting hot regenerated catalyst is returned through conduit 7 to the reactor.

To substantially strip the regenerated catalyst passing through conduit 7 of reactivating gas and combustion gases resulting from the reactivation step, regulated relatively small amounts of a suitable, relatively inert stripping fluid, such as steam, for example, are supplied to conduit 7 through line 14 and valve 15. Flow of the catalyst particles through conduit 7 may be controlled by a suitable valve or adjustable orifice, preferably provided at a relatively low point in the conduit and, in the particular case illustrated, a special form of flow regulating valve, indicated at 16, is provided to adjustably restrict the opening at the extreme lower end of conduit 7. A similar or other suitable type of flow regulator may be provided, when desired, in conduit 13, although not illustrated in this figure of the drawing.

In order to assist in maintaining a high concentration of catalyst particles in the fluid beds and maintain a high dense phase level in each reaction zone, a stream of catalyst particles is continuously directed from the upper region of fluid bed in the upper reaction zone, downwardly through conduit 17 into the lower portion of the reactor, wherein the returned catalyst particles meet the incoming stream of reactants supplied through line 8 and commingle therewith to pass upwardly in series through the reaction zones. However, as previously explained, it is desired to prevent any substantial recirculation of the desirable conversion products between the several reaction zones and, to accomplish this without obviating or eliminating recirculation of the catalyst throughout the reactor, regulated quantities of a suitable stripping fluid, such as steam, for example, are supplied to conduit 17 through line 18 and valve 19 to pass upwardly therethrough countercurrent to the descending column of catalyst particles and substantially strip the same of occluded vaporous and/or gaseous conversion products, so that the catalyst particles delivered from the lower end of conduit 17 are substantially free of such materials. The rate of catalyst recirculation through standpipe 17 and the reaction zones is controlled, in the case illustrated, by regulation of the flow control valve 16', which is similar to valve 16 and is constructed and arranged to adjustably restrict the opening at the lower end of conduit 17.

Referring now to Figure 2, the reactor here illustrated is of different specific form than that illustrated in Figure 1, but will accomplish substantially the same objectives. It comprises, in the case illustrated, three superimposed substantially cylindrical vessels designated as A, B and C, each having substantially conical upper and lower heads and interconnected by the necks 21 of materially reduced cross-sectional area.

In reactor 20 of Figure 2, as in the reactor illustrated in Figure 1, the three superimposed reaction zones each contain a fluid-like bed containing a relatively high concentration of solid catalyst particles and occupying the lower and major portion of the space defined by the vessel. A smaller, light phase, upper region also prevails above each of the fluid beds and the approximate dense phase level in each reaction zone is indicated at 54. The dense phases of the fluid beds in each reaction zone result from the employment of vapor-gas velocities which give hindered settling of the catalyst particles in each of the superimposed reaction zones and the increased velocity through the connecting necks 21 substantially prevents hindered settling of the catalyst particles therein so that there is little or no return flow of catalyst through these restricted zones.

Fluid reactants to be converted are supplied to the lower end of the reaction vessel through conduit 22 at a rate controlled by valve 23 and vaporous and/or gaseous reactants and entrained catalyst particles are directed from the light phase in the upper reaction vessel C to the cyclone separator 24, wherefrom separated catalyst particles are returned through standpipe 25 to the fluid bed in the upper reaction zone. Vaporous and/or gaseous conversion products are directed from the upper portion of separator 24 through line 26 and the pressure control valve 27 to suitable subsequent separating and recovery equipment, not illustrated.

Return flow of catalyst particles from the fluid bed in the upper reaction zone to the lower reaction zone is through conduit 28 and the rate of return is controlled by regulation of the valve 29, similar to valves 16 and 16' of Figure 1. Steam or other relatively inert fluid for stripping the column of catalyst particles passing through conduit 28 of fluid conversion products is introduced in regulated quantities through line 30 and valve 31.

Another stream of catalyst particles is directed through transfer line 32 from the fluid bed in the upper reactor C into the lower portion of the regenerating vessel 33 in amounts controlled by the adjustment of valve 29', and a suitable stripping medium for substantially freeing the column of catalyst particles flowing through line 32 of vaporous reactants and conversion products is supplied to line 32 through line 34 and valve 35.

A fluid-like bed containing a relatively high concentration of solid catalyst particles is also maintained in the regenerator 33 and occupies the lower and major portion of the vessel. As in the reactor, a smaller and substantially less dense upper phase containing a materially lower concentration of catalyst particles is maintained above the fluid bed in the regenerator. The approximate interface between the light and dense phases of the fluid bed in the regenerator is indicated at 36.

Air or other oxidizing gas for accomplishing combustion of the deleterious catalyst deposits is supplied to the lower portion of the regenerator through line 37 in amounts controlled by the regulation of valve 38. The oxidizing gas and resulting combustion gases flow upwardly through the regenerator to fluidize the catalyst bed therein and combustion gases are directed from the upper or light phase in the regenerator to the cyclone separator 39, wherefrom separated catalyst particles are returned through standpipe 40 to the fluid bed in the regenerator. Hot combustion gases are directed from the upper portion of separator 39 through line 41 and the pressure regulating valve 42, preferably to suitable heat recovery equipment, such as, for example, a waste-heat boiler, steam superheater, hot gas turbine or the like, not illustrated.

A stream of hot regenerated catalyst particles is continuously directed from the fluid bed in the regenerator through transfer line 43 into the lower portion of the reactor wherein this regenerated catalyst, as well as the catalyst returned to the lower portion of the reactor through conduit 28, meets the incoming fluid reactants and is transported with the latter and the resulting conversion products upwardly through the reaction zones A, B and C in series. In the particular case illustrated, a flow regulating valve 29", similar to the other flow regulating valves previously mentioned, is provided at the lower end of transfer line 43 but, when desired, either this valve 29" or the valve 29' may be eliminated or replaced by a simple butterfly or block valve which need be used only in case of emergency to stop the flow of catalyst through the particular transfer line in which it is disposed. A suitable relatively inert stripping medium, such as steam, for example, is supplied in regulated amounts to transfer line 43 through line 44 and valve 45 to substantially strip the column of catalyst particles passing through the latter of regenerating gases.

In conducting certain reactions, such as, for example, the catalytic cracking of relatively heavy oils or the catalytic aromatization of normally liquid hydrocarbons, the quantity of combustible contaminants deposited on the catalyst in the reactor will be materially in excess of that required to furnish, upon combustion in the regenerator, all of the heat necessary for conducting the hydrocarbon conversion reaction. In such instances, to prevent the development of excessive temperature in the regenerating zone and to return the regenerated catalyst to the reactor at the desired temperature level, I provide for abstracting heat from the regenerating step in addition to that carried from the regenerator in the outgoing combustion gases and that supplied to the reactor with the regenerated catalyst. This is accomplished, in the case illustrated, by continuously returning a stream of catalyst particles from the upper portion of the fluid bed in the regenerator through conduit 46, cooler 47 and conduit 48 to the lower portion of the regenerator.

The desired quantity of heat is abstracted from this circulating stream of catalyst as it passes through cooler 47 by heat exchange with a suitable cooling medium supplied to the latter through line 49 and valve 50 and discharged therefrom through line 51. A suitable block valve 52 is preferably provided in line 48 for stopping the flow of catalyst through cooler 47 in case it is not necessary to abstract additional heat from the regenerating zone or valve 52 may, when desired, be employed to control the rate of catalyst flow through cooler 47. However, this will not ordinarily be necessary since the quantity of heat abstracted may be controlled by regulation of valve 50 in line 49 and by the temperature of the incoming cooling fluid.

In conducting certain other reactions, such as, for example, the catalytic dehydrogenation of normally gaseous hydrocarbons, the quantity of combustible contaminants deposited on the catalyst in the reaction zone will be less than that required to supply the desired amount of heat to the reaction zone. In such instances, I provided for burning additional fuel from an external source in the regenerating step in the amount required to furnish the necessary additional heat and store it in the regenerated catalyst supplied from the regenerator to the reactor. A burner 53 is provided in the case illustrated for this purpose and the additional fuel thus supplied to the regenerator is burned in direct contact with the catalyst undergoing regeneration therein.

It will be understood that many modifications of and minor departures from the specific apparatus and flow illustrated in the drawing may be employed without departing from the scope of the invention. The particular manner in which regeneration of the catalyst or contact material is accomplished is not a limiting feature of the invention and it is not necessary that solid catalyst or contact material for regeneration be withdrawn from the upper section of the reactor or that the regenerated catalyst or contact material be returned to the lower section of the reactor, since internal circulation of the catalyst or contact material throughout the reaction zone as herein provided permits removal of catalyst for regeneration and introduction of regenerated catalyst at any desired point in the fluid-like mass in the reaction zone.

It is, of course, also within the scope of the invention to employ any desired number of a plurality of separate, superimposed fluid-like beds in the reactor, although three are illustrated in each of the Figures 1 and 2. Also, the advantageous features of the invention will not be entirely avoided in a reactor employing three or more separate fluid-like beds if the catalyst or contact material, after being substantially stripped of fluid conversion products, is returned from any one or more of said beds to any one or more lower beds of the series.

My co-pending application Serial Number 474,148, filed January 30, 1943, discloses and claims a system of the fluid bed type employing what is termed "true dense phase" transfer of subdivided solid catalyst or contact material from the endothermic reaction step to an exothermic regenerating step and back from the regenerating step to the reaction step. This co-pending application refers to my previous co-pending application Serial Number 419,384, filed November 17, 1941, which discloses a somewhat similar fluid bed type system employing what is now commonly termed "light phase" transfer of the catalyst or contact material, or employing what is now generally termed "dense phase" transfer of the catalyst or contact material between the reaction and regenerating zones. In the present application I have illustrated and described a system employing the "true dense phase" transfer of the catalyst or contact material between the reaction and regenerating zones, as well as the true dense phase circulation of catalyst or contact material throughout the reaction zone. The manner in which this type of transfer is effected is fully explained in my aforementioned co-pending application Serial 474,148. However, I do not wish to limit the present invention to the true dense phase transfer of the subdivided solid material between the reaction and regenerating zones since the otherwise novel features herein provided are advantageous as applied to fluid bed type systems employing either the light phase transfer or the dense phase transfer of catalyst as disclosed in Serial 419,384.

I also specifically contemplate use of the features herein provided of dividing the reaction space into a plurality of superimposed smaller reaction zones with upward flow of subdivided solid contact material, fluid reactants and fluid conversion products through these zones in series and with the return of substantially stripped solid particles from one or more upper zones of the series to one or more lower zones thereof, in a system employing one method of transfer (light phase, dense phase or true dense phase) from the reactor to the regenerator and employing any other method of transfer (light phase, dense phase or true dense phase) from the regenerator to the reactor, as well as systems employing any one of said several methods of transfer in both directions.

The features of the invention will be found advantageous in conducting various operations of the general class herein described and it is, therefore, not intended to limit the invention to any specific reaction, nor to the use of any specific catalyst or subdivided solid contact mass. However, as previously pointed out, the apparatus and mode of operation which it provides are particularly advantageous as applied to catalytic dehydrogenation of hydrocarbons and a brief description of such an operation will serve as a more specific illustration of the invention, its features and advantages.

In this particular operation the charging stock to be dehydrogenated consists principally of normal butane and the catalyst employed is a synthetic composite consisting predominantly of activated alumina and containing approximately 2% magnesium oxide and approximately 12% chromium oxide determined as $Cr_2O_3$. The average particle size of the catalyst is approximately 80 to 100 microns. A single fluid-like bed is maintained in the regenerator and four fluid-like beds, separated by perforate plates, are maintained in the reactor. The average vapor-gas velocity in the fluid beds in the reactor is approximately 0.8 feet per second and this velocity is increased to approximately 25 feet per second through the perforate plates separating the beds.

Catalyst is transferred from the upper region of the uppermost fluid bed in the reactor to the lower portion of the lowermost bed therein through a standpipe and is substantially stripped of fluid reactants and conversion products in passing through this standpipe. The rate of catalyst return through the standpipe is about twenty times the weight of butane charged to the process. The weight hourly spaced velocity (pounds of hydrocarbons supplied to the reactor per hour, per pound of catalyst present in the reactor) in this particular operation was approximately 0.90, although space velocities ranging from 0.2 to 4.0 may be successfully employed.

The butane is charged to the reactor at a temperature of approximately 906° F., and an average temperature of about 1031° F. is maintained in the reaction zone. The reactor is operated at a gauge pressure, measured at its upper end, of approximately 3 pounds.

Regeneration of the catalyst is accomplished by employing preheated air as the regenerating gas and an average temperature of approximately 1150° F. is maintained in the regenerating zone. The weight ratio of regenerated catalyst to hydrocarbon reactants entering the reaction zone in this particular operation is maintained at approximately 7.5.

Under the above conditions, approximately 42% total conversion of the butane charge is obtained with an efficiency of approximately 77% expressed in terms of the mols of butylenes produced per mol of butane decomposed.

The above operation may be compared with a similar dehydrogenating operation employing the same charging stock and catalyst and conducted in a fluid bed type system similar to that employed in the above test, except that no partitioning means are provided in the reactor and no provision is made for stripping the recycled catalyst particles, the reactor employing a single fluid-like bed with turbulence and hindered settling of the catalyst throughout the bed. When an operation of the latter type is conducted under conditions to obtain the same total conversion as in the preceding test, the efficiency is reduced to approximately 70%, thus clearly demonstrating the advantages of the provisions of the invention.

I claim:

1. A process for the conversion of hydrocarbons, which comprises maintaining a plurality of separate superimposed fluid-like beds of subdivided solid catalyst for promoting the conversion reaction within a confined reaction zone, said conversion reaction being endothermic and resulting in the deposition of heavy combustible contaminants on the catalyst particles, passing the hydrocarbon reactants and resulting fluid conversion products upwardly through said beds in series at a velocity such as to effect substantial hindered settling of catalyst particles in each of the beds, passing the hydrocarbons together with suspended catalyst particles from each of said beds to the succeeding higher bed through a region of said reaction zone at sufficiently increased velocity to substantially prevent hindered settling of the suspended catalyst particles in said region, removing a stream of said catalyst particles from an upper bed of the series, substantially stripping said stream of occluded fluid reactants and conversion products and thereafter supplying it, without regeneration, to a lower bed of the series, removing a stream of contaminated catalyst particles from the uppermost bed of the series in the reaction zone and supplying the same to a separate confined regenerating zone, therein burning combustible contaminants from the catalyst particles in a stream of oxidizing gas to regenerate the catalyst and store heat therein, and returning a stream of hot regenerated catalyst from the regenerating zone to at least one of the catalyst beds in the reaction zone.

2. A process for the conversion of hydrocarbons which comprises maintaining a plurality of vertically spaced, relatively dense fluid-like beds of solid catalyst particles at conversion temperature in a reaction zone, introducing the hydrocarbons and subdivided catalyst particles to the lower portion of said zone and passing the hydrocarbons upwardly in series through said beds at a velocity such as to effect substantial hindered settling of catalyst particles in each of the beds, transferring catalyst particles from the lower bed of the series to the next higher bed in suspension in the hydrocarbons passing from said lower bed to the higher bed and through a region of said reaction zone at sufficiently increased velocity to substantially prevent hindered settling of the suspended catalyst particles in said region, removing a stream of catalyst particles from the uppermost bed of the series and stripping the same of hydrocarbons, and then introducing said stream to the lowermost catalyst bed of the series.

3. A process for the conversion of hydrocarbons which comprises maintaining a plurality of vertically spaced, relatively dense fluid-like beds of solid catalyst particles at conversion temperature in a reaction zone, introducing the hydrocarbons subdivided catalyst particles to the lower portion of said zone and passing the hydrocarbons upwardly in series through said beds at a velocity such as to effect substantial hindered settling of catalyst particles in each of the beds, transferring catalyst particles from a lower bed of the series to the next higher bed in suspension in the hydrocarbons passing from said lower bed to the higher bed and through a region of said reaction zone at sufficiently increased velocity to substantially prevent hindered settling of the suspended catalyst particles in said region, removing a stream of catalyst particles from the uppermost bed of the series and passing the same downwardly by gravity to the lowermost bed of the series in a confined vertical path within said reaction zone, and stripping said catalyst stream of hydrocarbons while in transit through said confined vertical path.

LOUIS S. KASSEL.

REFERENCES CITED

The following references are of record in the file of this patent:

UNITED STATES PATENTS

| Number | Name | Date |
| --- | --- | --- |
| 2,288,613 | Dill | July 7, 1942 |
| 2,298,593 | Rubin et al. | Oct. 13, 1942 |
| 2,307,879 | Cornell | Jan. 12, 1942 |
| 2,311,564 | Munday | Feb. 16, 1943 |
| 2,325,516 | Holt et al. | July 27, 1943 |
| 2,327,489 | Becker | Aug. 24, 1943 |
| 2,341,193 | Scheineman | Feb. 8, 1944 |
| 2,302,209 | Goddin, Jr. | Nov. 17, 1942 |
| 2,345,487 | Liedholm | Mar. 28, 1944 |
| 2,356,697 | Rial | Aug. 22, 1944 |
| 2,360,463 | Arveson | Oct. 17, 1944 |
| 2,367,281 | Johnson | Jan. 16, 1945 |